United States Patent
Bergstrom et al.

(10) Patent No.: US 10,339,476 B1
(45) Date of Patent: Jul. 2, 2019

(54) FIXTURE-AWARE SYSTEM FOR AUTOMATICALLY ALLOCATING FLOOR SPACE

(71) Applicant: WALGREEN CO., Deerfield, IL (US)

(72) Inventors: John M. Bergstrom, Palatine, IL (US); David Pisinger, Frederiksberg (DK)

(73) Assignee: WALGREEN CO., Deerfield, IL (US)

( * ) Notice: Subject to any disclaimer, the term of this patent is extended or adjusted under 35 U.S.C. 154(b) by 919 days.

(21) Appl. No.: 14/831,724

(22) Filed: Aug. 20, 2015

Related U.S. Application Data (60) Provisional application No. 62/040,067, filed on Aug. 21, 2014.

(51) Int. Cl.
*G06Q 10/06* (2012.01)
*G06Q 10/04* (2012.01)

(52) U.S. Cl.
CPC ......... *G06Q 10/0631* (2013.01); *G06Q 10/04* (2013.01)

(58) Field of Classification Search
CPC ..................................................... G06Q 10/04
See application file for complete search history.

(56) References Cited

U.S. PATENT DOCUMENTS

| | | | |
|---|---|---|---|
| 6,598,025 B1 * | 7/2003 | Hamilton | G06Q 10/087 235/385 |
| 9,558,458 B2 * | 1/2017 | Yang | G06Q 10/04 |
| 2002/0107819 A1 * | 8/2002 | Ouimet | G06Q 10/02 705/400 |
| 2007/0221455 A1 * | 9/2007 | Nikovski | B66B 1/18 187/384 |
| 2013/0226826 A1 * | 8/2013 | Hathaway | G06Q 30/02 705/348 |
| 2014/0067467 A1 * | 3/2014 | Rangarajan | G06Q 30/02 705/7.31 |

OTHER PUBLICATIONS

Genetic algorithm with variable neighborhood search for the optimal allocation of goods in shop shelves; Mauro Castelli, Leonardo Vanneschi; Available online Jun. 9, 2014 (Year: 2014).*
Variable neighborhood search and local branching; Pierre Hansen, Nenad Mladenovi, Dragan Uroševi; Available online Aug. 24, 2005 (Year: 2006).*
An efficient algorithm to allocate shelf space; Ming-Hsien Yang; Feb. 11, 1999 (Year: 2001).*
Metaheuristics with Local Search Techniques for Retail Shelf-Space Optimization; Andrew Lim; Brian Rodrigues; Xingwen Zhang; 2004 (Year: 2004).*

* cited by examiner

*Primary Examiner* — Deirdre D Hatcher
(74) *Attorney, Agent, or Firm* — Marshall, Gerstein & Borun LLP; Randall G. Rueth (57) ABSTRACT

A method for automatically allocating floor space includes obtaining: (i) fixture data, (ii) business rule data, and (iii) benefit data. The method further includes searching a plurality of arrangements of the plurality of categories of products on the plurality of merchandizing fixtures according to the obtained data and determining an allocation solution. The allocation solution specifies a combination of the plurality of categories of products, an identification of ones of the plurality of merchandizing fixtures allocated to each of the combination of the plurality of categories of products, and an amount of the ones of the plurality of merchandizing fixtures allocated to each of the combination of the plurality of categories of products.

8 Claims, 10 Drawing Sheets

302 { #Store 12345
Fixtures

| #Fixture ID | Fixture Length | Fixture Type | Fixture Height (in) |
|---|---|---|---|
| 1 | 27 | Counter | 66 |
| 2 | 27 | Counter | 66 |
| 3 | 30 | Counter | 66 |
| 4 | 30 | Counter | 66 |
| 5 | 30 | Counter | 66 |
| 6 | 30 | Counter | 66 |
| 7 | 30 | Counter | 66 |
| 8 | 39 | Counter | 66 |
| 9 | 21 | Standard Wall | 72 |
| 10 | 9 | Standard Wall | 72 |

| | Department Description | Mandatory Forbidden Location(s) | | | | | | |
|---|---|---|---|---|---|---|---|---|
| D1 | Diapers | | | | | | | |
| D3 | Baby Wipes | 1 | 2 | 4 | 5 | 6 | 7 | 8 |
| D4 | Formula | | | | | | | |
| D5 | Cough and Cold | 9 | 10 | | | | | |
| D6 | Pain Medicine | | | | | | | |
| D7 | First Aid | | | | | | | |
| D8 | Diet Sports Nutrition | | | | | | | |
| D9 | Vitamins | | | | | | | |
| D10 | Pediatrics | | | | | | | |
| D11 | Convalescence | 9 | 10 | | | | | |
| D12 | ... | | | | | | | |

502: #Fobiddenlocations, #Department ID
504, 506, 508
500

FIG. 5

| #DeptID | DeptDesc. | Include | FlexDownBy | ButNotBelow | FlexUpBy | ButNotAbove | ConstraintUnits | SpaceIncrement |
|---|---|---|---|---|---|---|---|---|
| D1 | Diapers | 1 | -3 | 1 | 2 | 20 | Section | 3 |
| D3 | Baby Wipes | 1 | -2 | 0 | 3 | 8 | Section | 2 |
| D4 | Formula | 1 | -1 | 1 | 2 | 16 | Section | 3 |
| D5 | Cough and Cold | 1 | -2 | 1 | 2 | 10 | Section | 3 |
| D6 | Pain Medicine | 1 | -2 | 1 | 1 | 20 | Section | 3 |
| D7 | First Aid | 1 | -2 | 1 | 2 | 20 | Section | 1 |
| D8 | Diet Sports Nutrition | 1 | -4 | 1 | 2 | 20 | Section | 3 |
| D9 | Vitamins | 1 | -2 | 1 | 4 | 22 | Section | 3 |
| D10 | Pediatrics | 1 | -1 | 0 | 2 | 10 | Section | 4 |
| D11 | Convalescence | 1 | -2 | 1 | 2 | 12 | Section | 3 |
| D12 | ... | 1 | -2 | 1 | 2 | 14 | Section | 3 |

FIG. 6

Profit Table For 66 inch Height Fixture — 700

Profit Table For 72 inch Height Fixture — 702

| #DepartmentID | Length | Sales | #DepartmentID | Length | Sales |
|---|---|---|---|---|---|
| D1 | 3 | 768 | D1 | 3 | 809 |
| D1 | 6 | 997 | D1 | 6 | 1006 |
| D1 | 9 | 1017 | D1 | 9 | 1017 |
| D1 | 12 | 1017 | D1 | 12 | 1017 |
| D1 | 15 | 1017 | D1 | 15 | 1017 |
| D2 | 3 | 275 | D2 | 3 | 297 |
| D2 | 6 | 472 | D2 | 6 | 497 |
| D2 | 9 | 572 | D2 | 9 | 586 |
| D2 | 12 | 608 | D2 | 12 | 613 |
| D2 | 15 | 618 | D2 | 15 | 619 |
| D2 | 18 | 619 | D2 | 18 | 620 |
| D2 | 21 | 620 | D2 | 21 | 620 |
| D3 | 3 | 425 | D3 | 3 | 455 |
| D3 | 6 | 651 | D3 | 6 | 671 |
| D3 | 9 | 714 | D3 | 9 | 719 |
| D3 | 12 | 724 | D3 | 12 | 725 |
| D3 | 15 | 725 | D3 | 15 | 725 |
| D3 | 18 | 725 | D3 | 18 | 725 |
| D4 | 12 | 676 | D4 | 12 | 714 |
| D4 | 15 | 770 | D4 | 15 | 803 |
| D4 | 18 | 835 | D4 | 18 | 859 |
| D4 | 21 | 875 | D4 | 21 | 892 |
| D4 | 24 | 899 | D4 | 24 | 909 |
| D4 | 27 | 912 | D4 | 27 | 918 |
| D4 | 30 | 919 | D4 | 30 | 922 |
| D4 | 33 | 922 | D4 | 33 | 923 |
| D4 | 36 | 923 | D4 | 36 | 924 |
| D5 | 3 | 803 | D5 | 3 | 858 |
| D5 | 6 | 1209 | D5 | 6 | 1243 |
| D5 | 9 | 1314 | D5 | 9 | 1321 |
| D5 | 12 | 1327 | D5 | 12 | 1328 |
| D5 | 15 | 1328 | D5 | 15 | 1328 |
| D5 | 18 | 1328 | D5 | 18 | 1328 |
| D5 | 21 | 1328 | D5 | 21 | 1328 |
| ... | ... | ... | ... | ... | ... |

FIG. 7 solution 1 ← 800
dept D12 fixture 1 profit 290 weight 18
dept D16 fixture 1 profit 714 weight 9
dept D14 fixture 2 profit 1314 weight 9
dept D17 fixture 2 profit 835 weight 18
dept D15 fixture 3 profit 997 weight 6
dept D2 fixture 3 profit 1347 weight 24
dept D5 fixture 4 profit 2107 weight 30
dept D10 fixture 5 profit 3120 weight 21
dept D4 fixture 5 profit 1465 weight 9
dept D1 fixture 6 profit 205 weight 3
dept D11 fixture 6 profit 761 weight 15
dept D6 fixture 6 profit 167 weight 6
dept D13 fixture 6 profit 168 weight 6
dept D8 fixture 7 profit 3479 weight 30
dept D3 fixture 8 profit 7917 weight 39
dept D9 fixture 9 profit 3475 weight 21
dept D7 fixture 10 profit 572 weight 9
checked profit sum 28933 weight sum 273 solution 2
dept D16 fixture 1 profit 714 weight 9
dept D12 fixture 1 profit 290 weight 18
dept D17 fixture 2 profit 835 weight 18
dept D14 fixture 2 profit 1314 weight 9
dept D2 fixture 3 profit 1347 weight 24
dept D15 fixture 3 profit 997 weight 6
dept D5 fixture 4 profit 2107 weight 30
dept D10 fixture 5 profit 3120 weight 21
dept D4 fixture 5 profit 1465 weight 9
dept D9 fixture 6 profit 3475 weight 21
dept D6 fixture 6 profit 167 weight 6
dept D1 fixture 6 profit 205 weight 3
dept D8 fixture 7 profit 3479 weight 30
dept D3 fixture 8 profit 7917 weight 39
dept D13 fixture 9 profit 168 weight 6
dept D11 fixture 9 profit 761 weight 15
dept D7 fixture 10 profit 572 weight 9
checked profit sum 28933 weight sum 273 solution 3
dept D12 fixture 1 profit 290 weight 18
dept D16 fixture 1 profit 714 weight 9
dept D14 fixture 2 profit 1314 weight 9
⋮

FIXTURE-AWARE SYSTEM FOR AUTOMATICALLY ALLOCATING FLOOR SPACE

RELATED APPLICATIONS

This application is a non-provisional patent application that claims priority to and the benefit of the filing date of U.S. Provisional Patent Application No. 62/040,067, entitled "FIXTURE-AWARE SYSTEM FOR AUTOMATICALLY ALLOCATING FLOOR SPACE" and filed on Aug. 21, 2014, the disclosure of which is hereby incorporated by reference in its entirety.

TECHNICAL FIELD

This disclosure relates generally to improving a retail area, in particular, to efficiently arranging an assortment of item categories within a store.

BACKGROUND

Allocating more physical space to a certain department of a retail store makes it possible to offer more items and/or brands or make certain items and/or brands more visible. However, space is expensive, and most stores have a fixed amount of space that cannot be extended. Such constraints motivate an optimization of space such that every inch of space available is used in the best (e.g., most profitable) manner.

This space optimization problem can be defined as follows: given a set of departments and a set of fixtures (e.g., shelving units), each department (e.g., category of products) can be realized in a number of sizes (widths and heights) or "realizations," each size having a different profitability (e.g., measured in sales, turnaround, or net profit). The space optimization problem is to assign departments to fixtures and choose a size for each department, such that the overall length of each fixture is respected, and such that the overall profitability is maximized. Furthermore, a valid solution to the space optimization has to satisfy a number of business rules, such as rules concerning mandatory placements of certain products, optional or mandatory departments, forbidden positions of certain products, required colocations of departments, etc.

The space optimization problem described above is closely related to multiple-choice multiple knapsack problems (MCMKPs). In the MCMKP one has several disjoined classes of items, and a number of knapsacks. Each item has a profit and weight. The task of a solver of the problem is to choose exactly one item from each class and assign it to a knapsack so that the overall profit is maximized while respecting the capacity on the weight for each knapsack. Currently, no solution is available to the above-described space optimization which can handle the extra business constraints, such as mandatory placements or forbidden positions.

SUMMARY

In one embodiment, a computer-implemented method comprises obtaining: (i) fixture data representing a plurality of merchandizing fixtures in a retail space, (ii) business rule data representing a plurality of business rules associated with a plurality of categories of products, the plurality of business rules including at least one of forbidden locations, mandatory locations, or colocations of the plurality of categories on the plurality of merchandizing fixtures, and (iii) benefit data representing a dependency of a benefit of each of the plurality of categories of products on an amount of one of the plurality of merchandizing fixtures allocated to the category of products. The computer-implemented method further includes searching, by a floor space allocator, a plurality of arrangements of the plurality of categories of products on the plurality of merchandizing fixtures according to the fixture data, the business rule data, and the benefit data and according to a branching strategy, and determining, by the floor space allocator, an allocation solution before all possible arrangements of the plurality of categories of products on the plurality of merchandizing fixtures are searched. The allocation solution specifies a combination of the plurality of categories of products, an identification of ones of the plurality of merchandizing fixtures allocated to each of the combination of the plurality of categories of products, and an amount of the ones of the plurality of merchandizing fixtures allocated to each of the combination of the plurality of categories of products. Also, the allocation solution corresponds to a substantially optimized benefit, the substantially optimized benefit based on the benefit of each category in the combination of the plurality of categories.

In another embodiment, a computer device for automatically allocating floor space comprises one or more processors and one or more non-transitory memories coupled to the one or more processors. The one or more non-transitory memories include computer executable instructions stored therein that specially configure the computer device such that, when executed by the one or more processors, the computer executable instructions cause the computer device to obtain: (i) fixture data representing a plurality of merchandizing fixtures in a retail space, (ii) business rule data representing a plurality of business rules associated with a plurality of categories of products, the plurality of business rules including at least one of forbidden locations, mandatory locations, or colocations of the plurality of categories on the plurality of merchandizing fixtures, and (iii) benefit data representing a dependency of a benefit of each of the plurality of categories of products on an amount of one of the plurality of merchandizing fixtures allocated to the category of products. Further, the computer executable instructions cause the computer device to search a plurality of arrangements of the plurality of categories of products on the plurality of merchandizing fixtures according to the fixture data, the business rule data, and the benefit data and according to a branching strategy and determine an allocation solution before all possible arrangements of the plurality of categories of products on the plurality of merchandizing fixtures are searched. The allocation solution specifies a combination of the plurality of categories of products, an identification of ones of the plurality of merchandizing fixtures allocated to each of the combination of the plurality of categories of products, and an amount of the ones of the plurality of merchandizing fixtures allocated to each of the combination of the plurality of categories of products. Further, the allocation solution corresponds to a substantially optimized benefit, the substantially optimized benefit based on the benefit of each category in the combination of the plurality of categories.

In yet another embodiment, a system comprises a data storage unit storing: (i) fixture data representing a plurality of merchandizing fixtures in a retail space, (ii) business rule data representing a plurality of business rules associated with a plurality of categories of products, the plurality of business rules including at least one of forbidden locations, mandatory locations, or colocations of the plurality of categories on the plurality of merchandizing fixtures, and (iii) benefit data representing a dependency of a benefit of each of the plurality of categories of products on an amount of one of the plurality of merchandizing fixtures allocated to the category of products. The system further comprises an access mechanism to access the fixture data, the business rule data, and the benefit data stored on the data storage unit, and a floor space allocator. The floor space allocator is configured to search a plurality of arrangements of the plurality of categories of products on the plurality of merchandizing fixtures according to the fixture data, the business rule data, and the benefit data obtained via the access mechanism and according to a branching strategy, and determine an allocation solution before all possible arrangements of the plurality of categories of products on the plurality of merchandizing fixtures are searched. The allocation solution specifies a combination of the plurality of categories of products, an identification of ones of the plurality of merchandizing fixtures allocated to each of the combination of the plurality of categories of products, and an amount of the ones of the plurality of merchandizing fixtures allocated to each of the combination of the plurality of categories of products. Further, the allocation solution corresponds to a substantially optimized benefit, the substantially optimized benefit based on the benefit of each category in the combination of the plurality of categories.

BRIEF DESCRIPTION OF THE DRAWINGS

FIG. 8 illustrates example allocation solutions that can be output of the floor space allocator of FIG. 1;

DETAILED DESCRIPTION

In the embodiments described below, a floor space allocator automatically determines combinations of space allocations, locations, and colocations for categories (e.g., departments, product types, brands, etc.) within a store such that a benefit (e.g., profit) is near maximized, the categories fit within the total available space, and all of business rules are satisfied. An input data set for the floor space generator may include data indicating category benefit as a function of category space allocation (e.g., "department benefit data"), available sizes of fixtures within a retail space (e.g., "merchandizing fixture data"), business rules related to categories, and the business rules related to the fixtures, among other types of data.

In some implementations, an algorithm utilized by the floor space allocator solves a "Multiple Choice, Multiple Knapsack Problem" (MCMKP). The output of the floor space allocator may include a list of categories to be included in a retail space, near optimal sizes of the categories within fixtures, and near optimal fixtures into which the categories should be placed. All or many "equal-benefit" solutions may also be generated by the floor space allocator.

Figure 1:
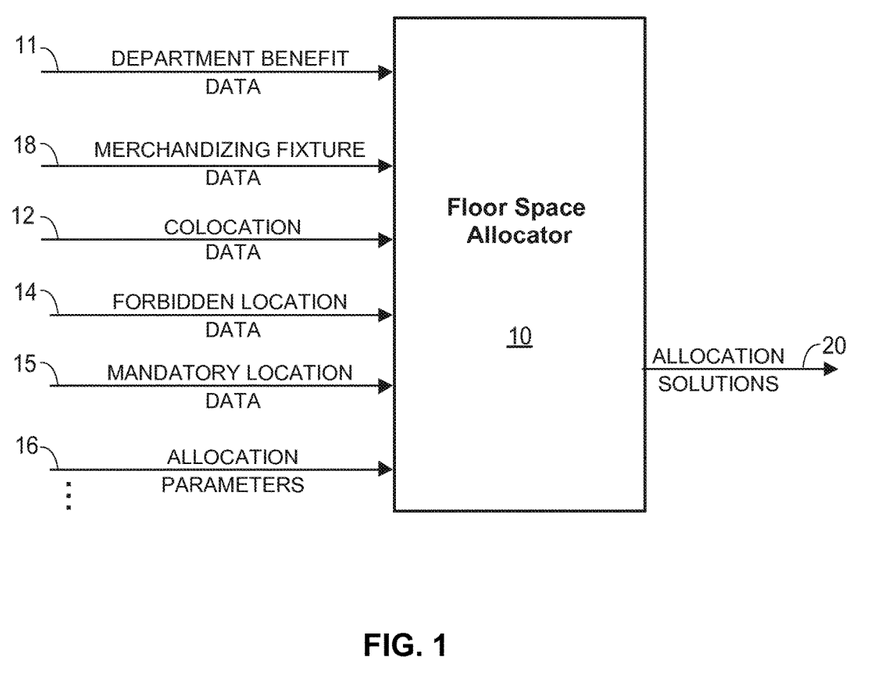
FIG. 1 illustrates an example floor space allocator that implements the techniques of the present disclosure to automatically allocate floor space within a retail store such that a benefit is near maximized or optimized, categories fit within a total available space, and certain business rules are satisfied.

Referring to FIG. 1, an example floor space allocator 10 receives department benefit data 11, colocation data 12, forbidden location data 14, mandatory location data 15, merchandizing fixture data 18, and allocation parameters 16. Depending on the implementation, the floor space allocator 10 may receive some or all of the data 11-18 in the form of a file conforming to a pre-defined format. Using the data 11-18, the floor space allocator 10 generates one or more allocation solutions 20 that may specify combinations of space, locations, and colocations for categories (e.g., departments, product types, brands, etc.) within a store. To generate the allocation solutions 20, the floor space allocator 10 may solve a MCMKP subject to and/or in accordance with the data 11-18. In an embodiment, the floor space allocator 10 implements a branch and bound algorithm, as further discussed below, to solve the MCMKP and generate the allocation solutions 20.

Figure 2:
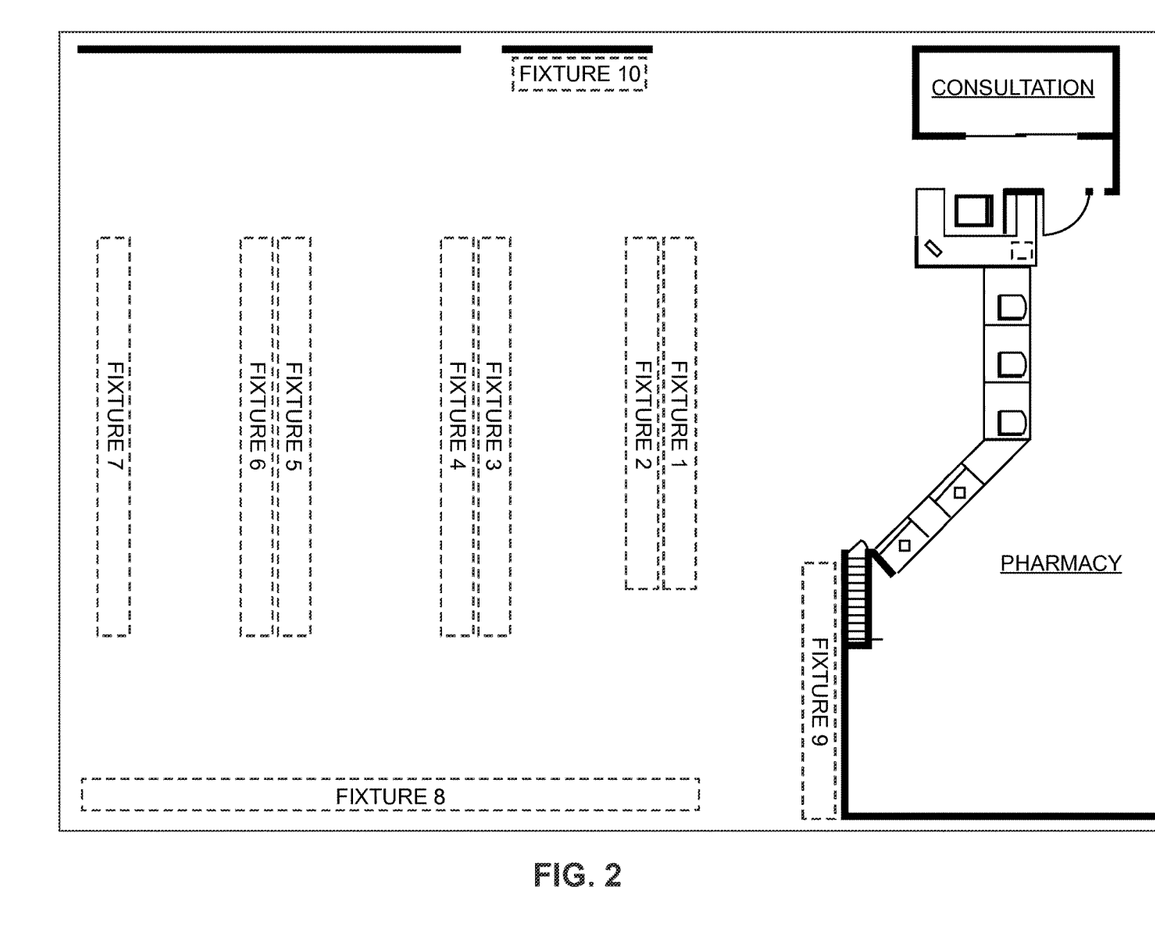
FIG. 2 illustrates an example retail area having several merchandizing fixtures on which the floor space allocator of FIG. 1 can operate.
Figure 3:
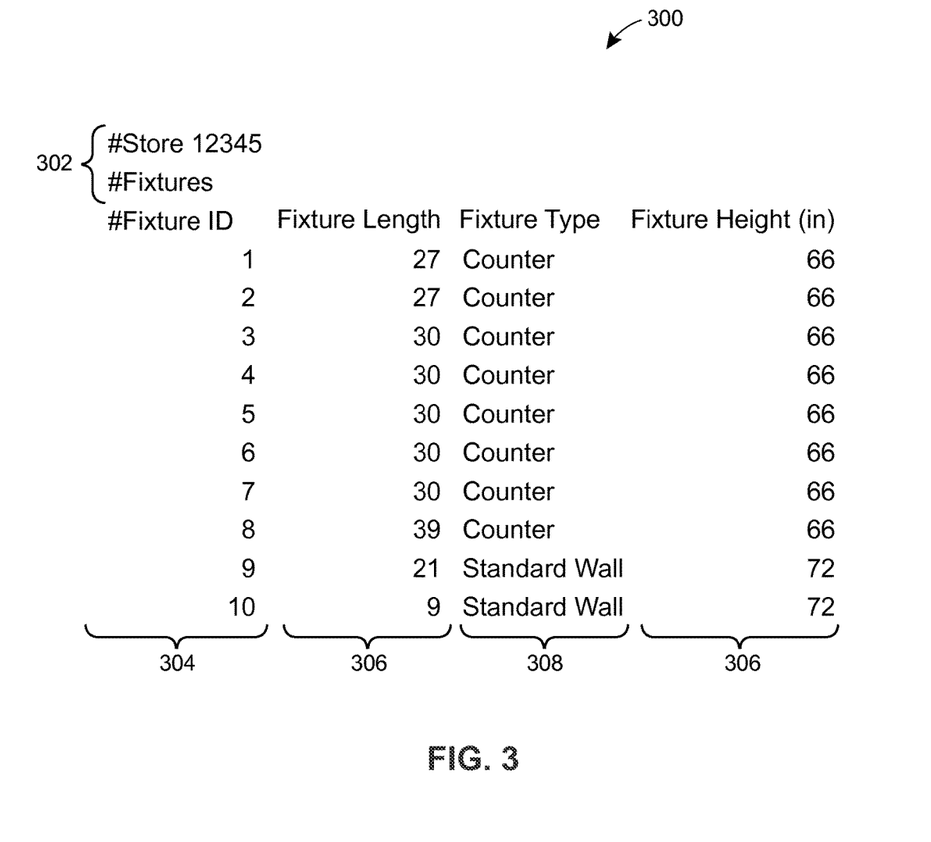
FIG. 3 illustrates example merchandizing fixture data that can be input to the floor space allocator of FIG. 1.

More specifically, the merchandizing fixture data 18 may specify a number, location, size, etc. of one or more merchandizing fixtures, such as shelves, racks, cabinets, or any other suitable retail fixtures, within a particular retail space (e.g., a particular store location of a retail company). FIG. 2 illustrates an example layout of ten merchandizing fixtures (labeled "Fixture 1"-"Fixture 10" in FIG. 2) in a retail store. In this example retail store, the merchandizing fixture data 18 may, by way of example, include data 300 about "Fixture 1"-"Fixture 10," as illustrated in FIG. 3. The example data 300 includes header information 302 identifying the particular store to which the data 300 corresponds. Also, the data 300 includes one or more fixtures identifications (IDs) 304, physical dimensions 306, and fixture types 308 (e.g., standard wall, counter, tall, cabinet, end cap, etc.) of the fixtures of the store illustrated in FIG. 2.

Figure 4:
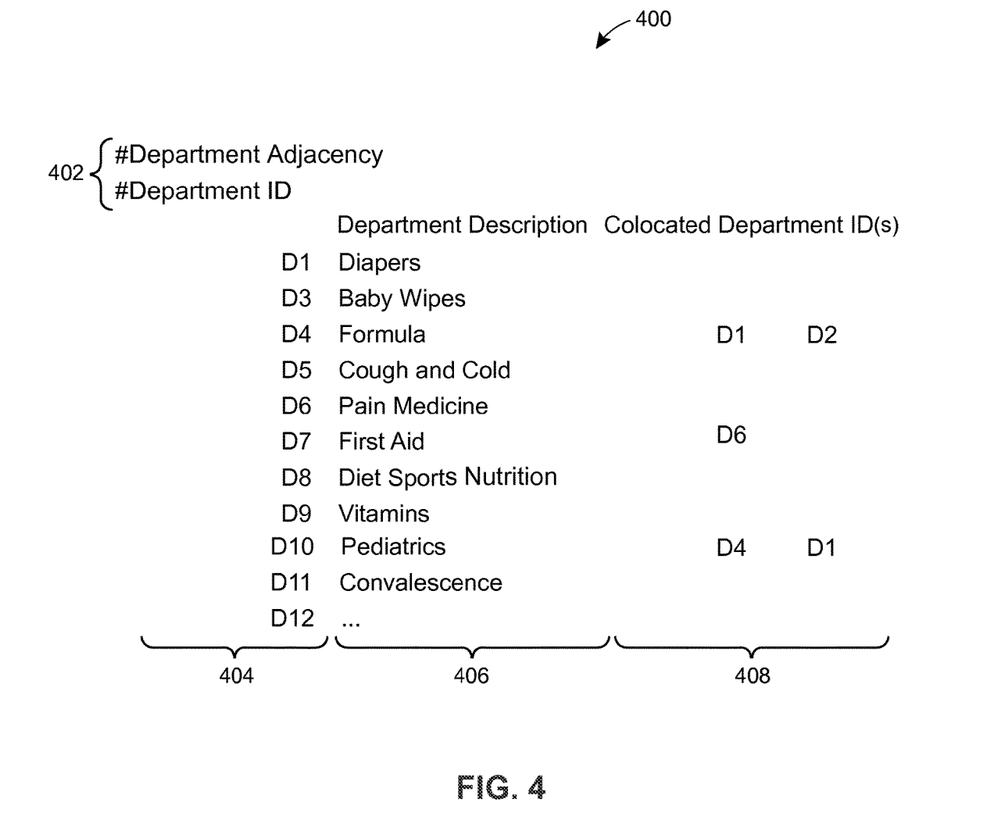
FIG. 4 illustrates example colocation data that can be input to the floor space allocator of FIG. 1.

The colocation data 18 may indicate which categories or departments of products within a store are to be located on the same fixture and/or adjacent to one another on the same fixture. FIG. 4 illustrates example colocation data 400 including general header information 402 identifying types or fields of data, department identifications 404, department descriptions 406, and, for each of the department identifications 404, one or more colocated department identifications 408. Although certain example departments are illustrated in FIG. 4, the techniques of the current disclosure may optimize the placement and allocation of space for any suitable departments or other categories of products other than those illustrated in FIG. 4, such as clothing categories, electronics categories, home furnishing (furniture, decorations, etc.) categories, etc.

The colocation data 400 may include, for each of the department identifications 404, any number of colocated departments 408. The colocated departments 408 may, in some implementations, indicate that some or all of the colocated departments 408 should be on the same merchandizing fixture as the department identified by the corresponding one of the department identifications 404. In other implementations, the colocated departments 408 may indicate that some or all of the colocated departments 408 should be directly adjacent to the department identified by the corresponding one of the department identifications 404 and/or may indicate which sides (e.g., left or right when looking from an aisle of a store) of the department identified by the corresponding one of the department identifications 404 the colocated departments 408 should be placed.

Figure 5:
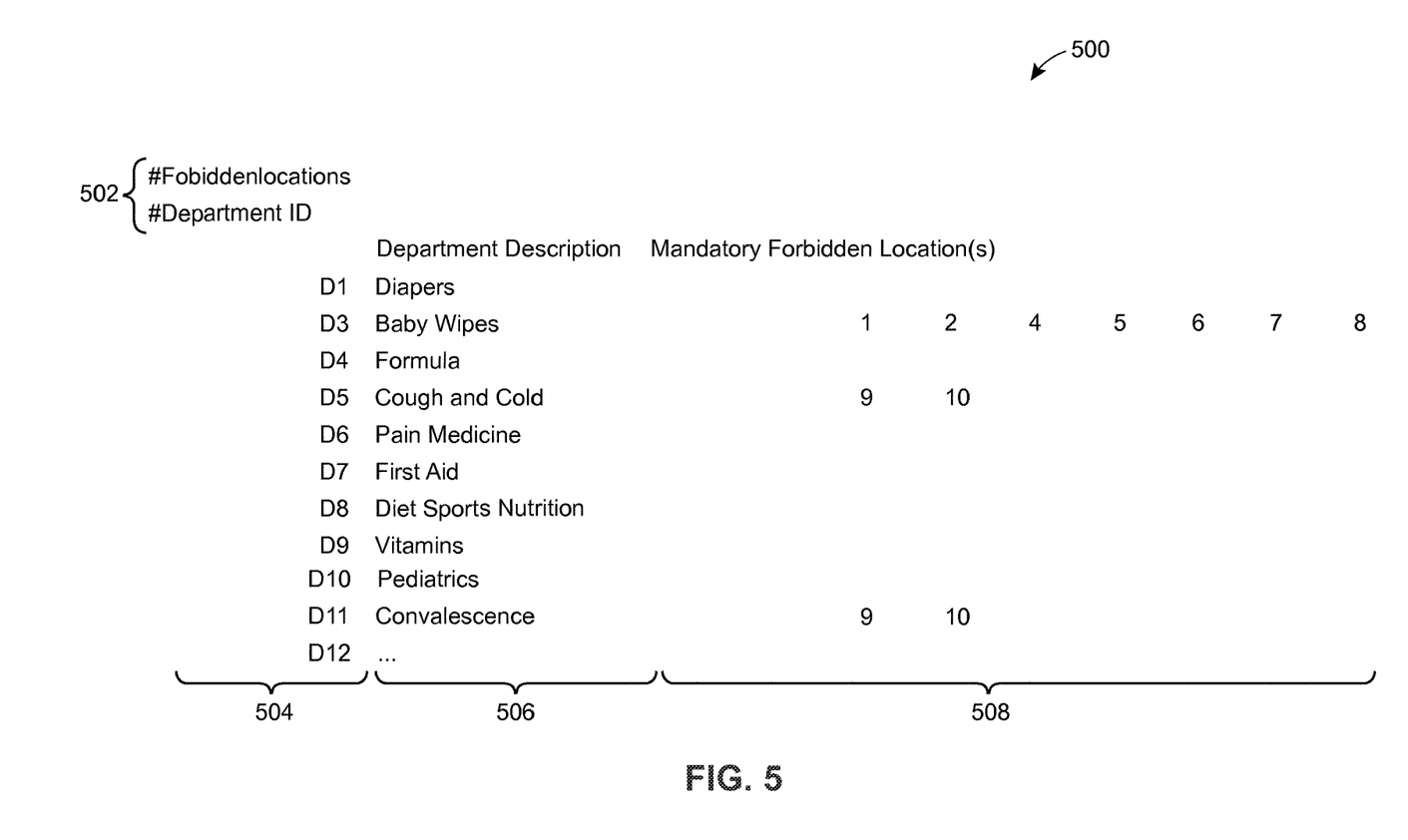
FIG. 5 illustrates example forbidden location data that can be input to the floor space allocator of FIG. 1.

The forbidden location data 14 may indicate, for each of a plurality of departments or categories of products, forbidden locations within a store for one or more departments or categories of products. FIG. 5 illustrates example forbidden location data 500 including header information 502 identifying types or fields of data, department identifications 504, department descriptions 506, and, for each of the department identifications 504, one or more forbidden locations 508. In the example forbidden location data 500, each of the forbidden locations 508 may correspond to one of the fixture identifications 304 in the example merchandizing fixture data 300. Further, each of the forbidden locations 508 may indicate that the department identified by the corresponding one of the department identifications 504 is not to be placed in the fixture identified by the respective forbidden location 508. In some implementations, a single mandatory location (e.g., on a particular one of a plurality of fixtures) for a department may be indicated in the forbidden locations 508 by including in the forbidden locations 508, for that department, an identification of every location other than the single mandatory location. In other implementations, separate mandatory location data 15 may indicate mandatory locations of product categories.

Figure 6:
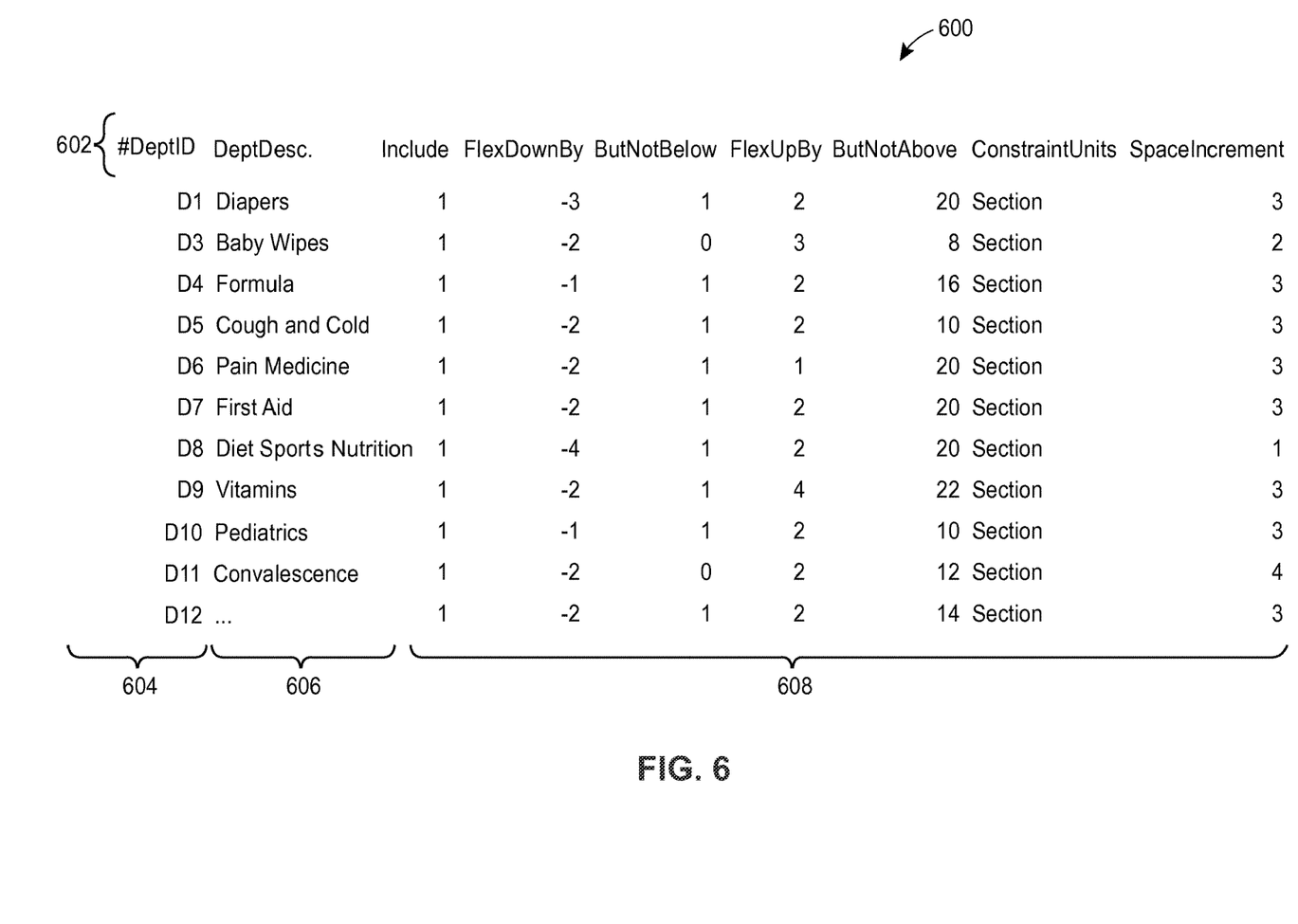
FIG. 6 illustrates example allocation parameters that can be input to the floor space allocator of FIG. 1.

The allocation parameters 16 may indicate certain growth and shrinking constraints for each of a plurality of departments to be placed in the fixtures defined by the merchandizing fixture data 18, in an implementation. FIG. 6 illustrates example allocation parameters 600 including header information 602 identifying types or fields of data, department identifications 604, department descriptions 606, and one or more growth and shrinking constraints 608 for each of the departments identified by the department IDs 604. The growth and shrinking constraints 608 may, by way of example, define, for a floor space allocator: (i) how much (e.g., in units of length or fixture sections) certain departments can grow or shrink (e.g., physically) within fixtures; (ii) increments by which algorithms of a floor space allocator may grow or shrink departments or categories, maximum and minimum sizes for categories or departments (e.g., including a size of zero for a non-existent department); and (iii) indications of whether or not the size and placement of certain departments should be included in optimizations of a floor space allocator. Generally, however, the allocation parameters 16 may include any suitable parameters for adjusting the operations of a floor space allocator with respect to each of a plurality of departments.

In some implementations, each department, or other product or item category, to be placed in fixtures of a retail space (at least optionally) may be realized in only a pre-defined, or otherwise defined, a number of sizes (e.g., widths and heights). That is, each department may have a number of well-defined number of "realizations." In some implementations, the allocation parameters 16 may at least partially define these realizations via the growth or shrinking parameters, maximum or minimum sizes, etc., as discussed above.

However, implementations of floor space allocators may allocate spaces for departments having any number and suitable type of realizations, and these realizations may be stored in any number of files or portions of data provided to the floor space allocator as input or for configuration.

Figure 7:
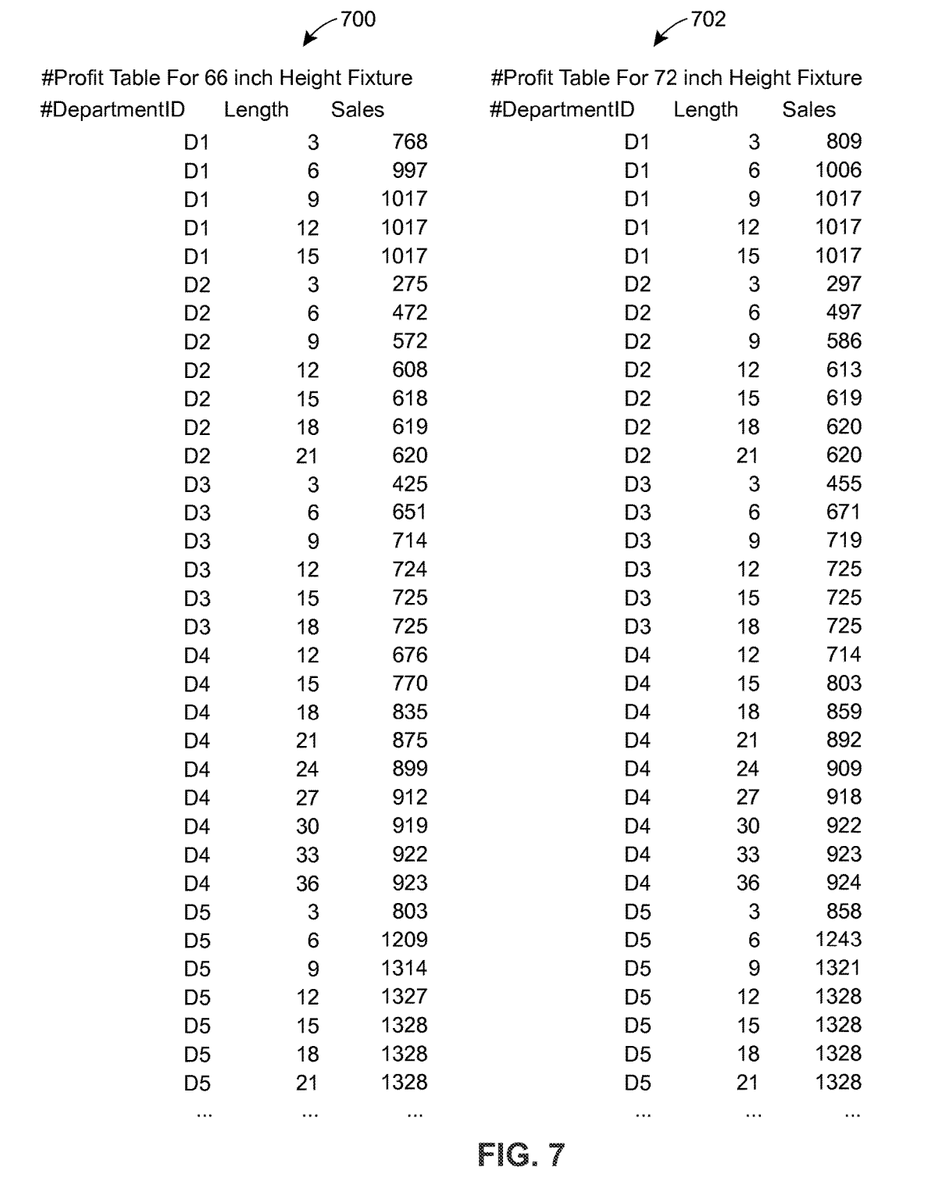
FIG. 7 illustrates example department benefit data that can be input to the floor space allocator of FIG. 1.

Returning again to FIG. 1, the department benefit data 11 may include one or more data sets defining the dependence of a benefit (e.g., profitability) of a department on one or more adjustable parameters, such as the size or placement of the department and/or a type of fixture at least partially allocated to the department. FIG. 7 illustrates two data sets 700 and 702 that indicate the dependence of sales (e.g., as measured in dollars per day or month) of departments, an example benefit, on lengths of the department on a sixty-six inch high fixture and a seventy-two inch fixture, respectively. Such data sets indicating dependences of benefits may be generated based on historical data, modeled or simulated data, approximated data, or benefit-related data generated in any other suitable manner. Further, department benefit data 11 may include multiple data sets per department representing multiple dependences of benefits corresponding to that department, such as a dependence on length and a dependence on height of the department.

Although FIGS. 3-7 illustrate separate data sets or portions of data for department benefit data, merchandizing fixture data, colocation data, forbidden location data, mandatory location data, and allocation parameters, some implementations of floor space allocators may receive as input or utilize data organized into any number of sets, portions, formats, etc. For example, a floor space allocator may receive only one data set or file including data substantially similar to the data 11-18 combined into the one data file. Generally, the business rules and input data discussed above with reference to data 11-18 may be combined or split into any number of files and may be structured in any suitable manner, such as tabular data, unstructured or semi-structured data, comma-separated values, etc. Further, although FIGS. 2-7 indicate certain numbers of departments, fixtures, etc., the input data received by the floor space allocator may indicate any number of departments or categories of products, fixtures, benefits forbidden locations, mandatory locations, colocations, and allocation parameters.

Each of the allocation solutions 20 generated by the floor space allocator may indicate which fixtures are to house certain departments or categories, how much (e.g., as measured in physical dimensions) of a fixture should be taken up by certain departments or categories, benefits (e.g., potential profits) of each department in the near optimized location, total benefits of the respective solution, and/or other parameters of the algorithms utilized to generated the allocation solutions 20, in an implementation. FIG. 8 illustrates example allocation solutions 800 including such information. Generally, the allocation solution 20 may include any number of solutions, each of which indicates how to allocate floor space within a retail store such that a benefit is near maximized, categories fit within a total available space, and certain business rules are satisfied. The floor space allocator 10 may output a certain pre-defined number of solutions, only a single solution with a highest or substantially maximized benefit, any solution above/below a certain threshold value of benefit, etc.

Figure 9:
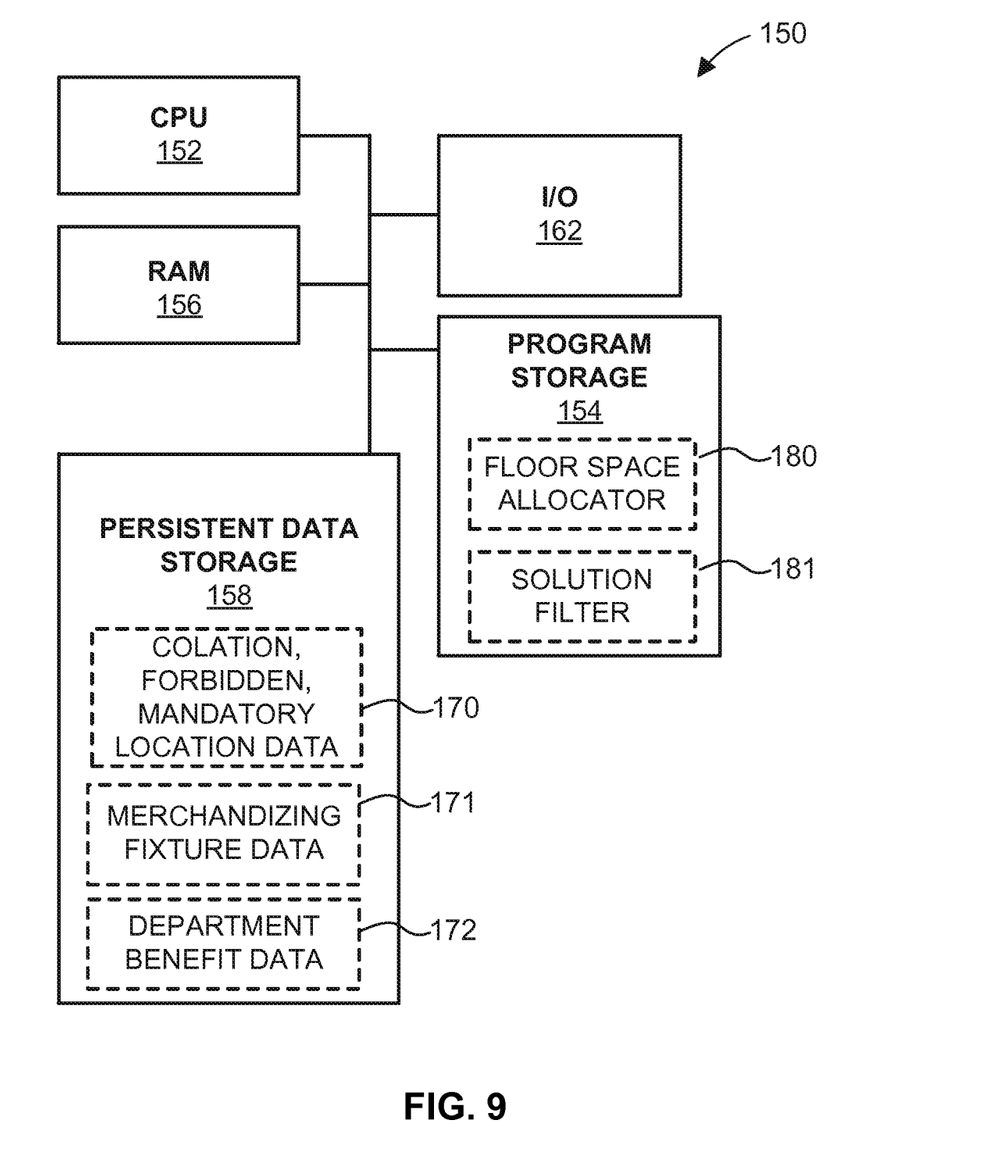
FIG. 9 illustrates an example computing device in which the floor space allocator of FIG. 1 is implemented, according to an embodiment.

Examples of a specially configured computing device and a computing network in which a floor space allocator can be implemented are discussed with reference to FIGS. 9 and 10, respectively. Referring first to FIG. 9, a specially configured computing device 150 includes one or more processors, depicted as a central processing unit (CPU) 152. The CPU 152 is particularly configured to operate by software instructions stored in a program storage 154, which may be any type of a suitable computer-readable medium. The program storage 154 may be, for example, a tangible non-transitory medium such as a hard disk or flash memory. In some implementations, the program storage 154 is implemented in a random access memory (RAM) module 156, a persistent data storage 158, or both. In addition to programs, the modules 156 and 158 may store data in a volatile or non-volatile mode, respectively. For example, merchandizing fixture configuration data 170 (which may be similar to the data 18 of FIG. 1), collation and forbidden/mandatory location data 171, and department benefit data 172 (which may be similar to the data 11-18 of FIG. 1) may be stored as data structures in the persistent data storage 158. During operation, the particularly or specially configured CPU 152 may load some or all of the data 170, 171, and 172 into the RAM module 156.

The computing device 150 also may include an input/output (I/O) subsystem 162 having one or several input devices to receive user input and one or more output devices to provide allocation solutions. Moreover, the computing device 150 may include additional modules, such as hardware components for wired or wireless communications (not shown). In general, the computing device 150 may be any suitable portable or non-portable computing device that is particularly configured to implement the specialized methods or techniques discussed herein, and accordingly may include various additional components in various implementations.

A floor space allocator 180 residing in the program storage 154 may operate on the data stored in the persistent data storage 158 and the RAM 156, for example, or received via the I/O module 162. The floor space allocator 180 may be a specialized module, routine, engine, etc. operating in a similar manner to the floor space allocator 10 discussed above. In some embodiments, a solution filter 181 may also reside in the program storage 154. The solution filter 181, when executed by the processors 152 may operate on output from the floor space allocator 180 (e.g., allocation solutions) so as to aid operators of the computing device 150 in selecting an appropriate one of the allocation solutions generated by the floor space allocator 180. That is, the solution filter 181 may specially configure the computing device 150 such that the computing device 150 is able to present or generate an appropriate one of many allocation solutions without excessive user interactions or unnecessary computer functions, such as processing user interactions, rendering solutions for visual inspection by operators, etc.

In some cases, the floor space allocator 180 may generate many allocation solutions that have substantially similar or equal benefits for a particular store. As such, the solution filter 181 may filter these solutions and/or compute further solutions to MCMKPs based on optional rules or criteria specific to a certain store. For example, the solution filter 181 may compare allocation solutions generated by the floor space allocator to a current layout of a store to identify the one of the allocation solutions requiring the fewest products rearrangements. Alternatively or additionally, the solution filter 181 may add additional business rules or other constraints to a MCMKP and trigger the floor space allocator to generate new allocations solutions based on the previous and newly added business rules or constraints.

Thus, the floor space allocator 180 and/or the solution filter 181 configure the computing device 150 to perform specialized functions, such as automatically generating allocation solutions for a retail space and automatically filtering allocations solutions to reduce operator involvement and effort. This example, specially-configured computing device 150 may generate, filter, and present allocation solutions more efficiently (e.g., in fewer processor cycles, with less memory utilization, with fewer costly transfers of data, or in less time) than operators or general purpose computers operating to manually or sequentially examine all possible combinations of space allocations, locations, and colocations for categories (e.g., departments, product types, brands, etc.) within a store. For example, because the computing device 150 may generate allocation solutions by evaluating only a subset of the combinations of space allocations, locations, and colocations for categories within a store, the computing device 150 may utilize only the processor cycles required to evaluate the subset of combinations, and "save" the processors cycles and/or processing time required to evaluate combinations other than the subset of combinations. Likewise, the computing device 150 may only need to temporarily store (e.g., in the RAM 156) numerical data, such as computed profits, associated with the subset of combinations, and, thus, the specially configured computing device 150 may operate with reduced memory usage as compared with a computing device evaluating all combinations of space allocations, locations, and colocations for categories within a store. Specific techniques utilized by the floor space allocator 180 and/or the solution filter 181 to efficiently generate allocation solutions are discussed further below.

Figure 10:
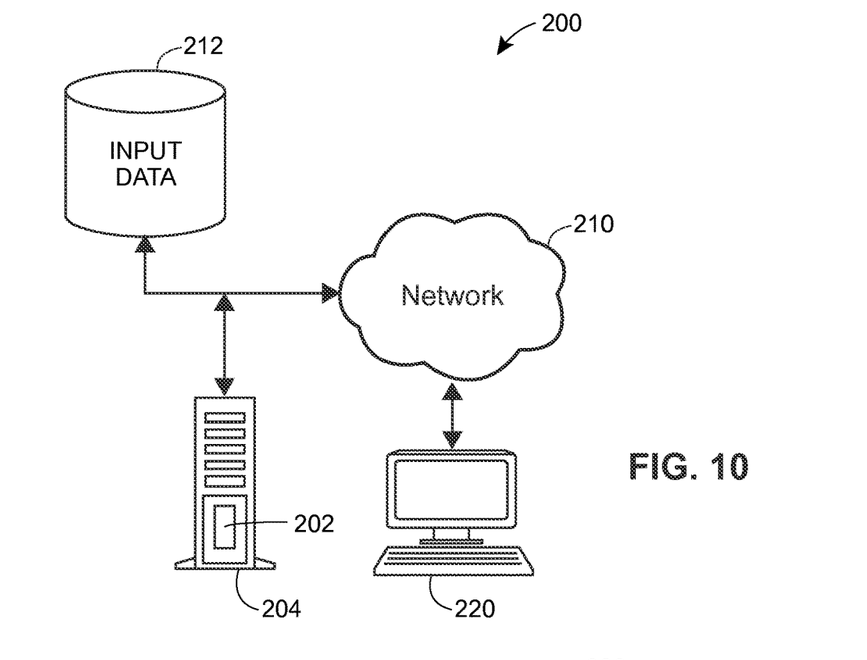
FIG. 10 illustrates an example computing network in which the floor space of FIG. 1 is implemented, according to another embodiment.

In some embodiments, a floor space allocator similar to the floor space allocator 10 or 150 operates in a network environment, such as in a communication network 200 illustrated in FIG. 10. In these embodiments, a floor space allocator 202 operates in a network server 204 connected to a network 210, to which an input database 212 (e.g., stored on one or more data storage units such as optical drives, solid state hard drives, tapes, etc.) also may be coupled. The input database 212 may store data similar to the data 11-18, as described further with reference to FIG. 3-7. The network 210 may be a local area network (LAN) or a wide area network (WAN), for example. In some implementations, the floor space allocator 202 may be distributed among multiple servers. A workstation 220, via which a user may interact with the floor space allocator 202, may be coupled to the server 204 via the network 210 and may access the database 212 via one or more data access mechanisms. The data access mechanisms utilized to access the database 212 may include, by way of example, a combination of physical links (e.g., cables), ports, jacks, etc. along with a combination of specially configured instructions, such as particularly configured database query programs, stored on the workstation 220.

As discussed above, the floor space allocator, such as the floor space allocator 10, may generate allocation solutions by solving a problem known as the Multiple Choice, Multiple Knapsack Problem (MCMKP), which problem is formulated according to data input to the floor space allocator (merchandizing fixture data 18, department benefit data 11, etc.). In this manner, the example floor space allocator 10 may determine near optimal allocation solutions without analyzing all combinations of space allocations, locations, and colocations for categories (e.g., departments, product types, brands, etc.) within a store. A example model of the multiple-choice multiple knapsack problem may be expressed as follows:

$$\text{maximize } \sum_{i=1}^{m} \sum_{j=1}^{n} \sum_{k \in N_j} p_{ijk} x_{ijk}$$

$$\text{subject to: } \sum_{j=1}^{n} \sum_{k \in N_j} w_{ijk} x_{ijk} \leq c_i, i = 1, \ldots, m,$$

$$\sum_{i=1}^{m} \sum_{k \in N_j} x_{ijk} = 1, j = 1, \ldots, n,$$

$$x_{ijk} \in \{0, 1\}, i = 1, \ldots, m, j = 1, \ldots, n, k \in N_j$$

The profit (e.g., benefit) p and weight (e.g., dimensions) w of an item (e.g., department or other category) depend on the "knapsack" it is assigned to (e.g., a merchandizing fixture).

Some floor space allocators may utilize this model for the MCMKP, while other floor space allocators may utilize various simplified or reformulated models of the MCMKP. For example, in a flat profit multiple-choice multiple knapsack problem, the profit p of a category, or "item," is the same regardless of a corresponding assigned knapsack, or fixture. This feature of the profit allows the objective function, utilized by some implementations of the floor space allocator 10, to be expressed as:
maximize:

$$\sum_{i=1}^{m} \sum_{j=1}^{n} \sum_{k \in N_j} p_{jk} x_{ijk}$$

Further, in the flat weight multiple-choice multiple knapsack problem, the weight w of an item is the same independent of knapsack. This simplification means that the capacity constraint, $$\sum_{j=1}^{n} \sum_{k \in N_j} w_{ijk} x_{ijk} \leq c_i$$

utilized by some implementations of floor space allocators, may be expressed as $$\sum_{j=1}^{n} \sum_{k \in N_j} w_{jk} x_{ijk} \leq c_i,$$

where $i=1, \ldots, m$ and $c_i$ is the capacity of knapsack (or "fixture") i.

In any event, in the preceding and following description, the following notation is utilized: (i) m is the number of fixtures (or "knapsacks") and $c_i$ be the size, or capacity of fixture $i=1, \ldots, m$; (ii) n is the number of department (or "items"), each department $j=1, \ldots, n$ having various choices for realization $N_1$ (i.e., every choice $k \in N_j$ represents a possible space allocation of department j); (iii) $p_{jk}$ is the profit of department j having choices $k \in N_j$, where the profit $p_{jk}$ for a certain fixture may depend on the height and width of the fixture, for example; (iv) $w_{jk}$ is the size of department j having choices $k \in N_j$; (v) $M_j$ is the set of mandatory fixtures for department j, where $|M_j| \leq 1$; (vi) $F_j$ is the set of forbidden fixtures for department j; and (vii) $A_j$ is the set of departments that must be colocated with department j (e.g., at least one of the departments $A_j$ should be colocated with department j).

Although these notations and representations of MCMKPs are utilized throughout this description, any number and combination of different notations and representations of MCMKPs may be utilized to configure, program, interact with, examine solutions generated by, etc. floor space allocators. The notation and representations of the MCMKPs described above are given by way of example and without limitation.

Further, although the terms "adjacent" and "colocated" are utilized above and in some place in this description, it is understood that "adjacent" and "colocated" may only imply colocation, co-location, or collocation and not literal adjacency. That is, adjacent or colocation may refer to items, or departments, that are located with another item or department without being directly or literally adjacent to the other item or department. However, in some implementations or scenarios, "adjacent" or "colocation" may imply a literal physical adjacency. Further, if a department j is optional (e.g., may or may not be placed in a retail space), a floor space allocator may handle the department j by extending the set $N_j$ of possible realizations with the choice (0,0). This handling will make it possible for the floor space allocator to choose an empty assignment, and hence in practice omit the department.

In some implementations, floor space allocators, such as the floor space allocator 10, may be configured to solve the MCMKP as an IP model by introducing the binary variables $x_{ijk}$, where $x_{ijk}=1$ if and only if a choice k of department j is assigned to fixture i. Such a formulation of the MCMKP leads to the example model:

$$\text{maximize } \sum_{i=1}^{m} \sum_{j=1}^{n} \sum_{k \in N_j} p_{jk} x_{ijk}$$

$$\text{subject to: } \sum_{j=1}^{n} \sum_{k \in N_j} w_{jk} x_{ijk} \leq c_i, i = 1, \ldots, m,$$

$$\sum_{i=1}^{m} \sum_{k \in N_j} x_{ijk} = 1, j = 1, \ldots, n,$$

$$\sum_{k \in N_j} x_{ijk} = 1, j \in M_j$$

$$\sum_{k \in N_j} x_{ijk} = 0, j \in F_j$$

$$\sum_{k \in N_j} \sum_{h \in N_j} x_{ijk} = \sum_{k \in N_j} \sum_{h \in N_j} x_{i'jk}, j \in A_j$$

$$x_{ijk} \in \{0, 1\}, i = 1, \ldots, m, j = 1, \ldots, n, k \in N_j$$

The first constraint, $$\sum_{j=1}^{n} \sum_{k \in N_j} w_{jk} x_{ijk} \leq c_i,$$

ensures that solutions generated by a floor space allocator satisfy a capacity constraint (e.g., maximum capacity or dimensions) for each fixture. The second constraint, $$\sum_{i=1}^{m} \sum_{k \in N_j} x_{ijk} = 1,$$

ensures that a floor space allocator chooses exactly one department or category for each department, and the selected department or category is assigned to exactly one fixture. The third constraint, $$\sum_{k \in N_j} x_{ijk} = 1,$$

enforces mandatory fixtures of department j. The fourth constraint, $$\sum_{k \in N_j} x_{ijk} = 0,$$

enforces forbidden fixtures for department j. The fifth constraint, $$\sum_{k \in N_j} \sum_{h \in N_j} x_{ijk} = \sum_{k \in N_j} \sum_{h \in N_j} x_{i'jk},$$

ensures that the floor space allocator assigns department j, j' to the same fixture, as indicated by the set of adjacent or colocated departments $A_j$.

In some implementations, a floor space allocator may solve this formulation of the multiple-choice multiple knapsack problem (MCMKP) with the above-mentioned constraints (e.g., defined by business rules) using a branch-and-bound algorithm. That is, a floor space allocator may employ a branching strategy to search through a "tree" of candidate solutions (e.g., candidate combinations of space allocations, locations, and colocations for categories within a retail space having a certain number of fixtures) while evaluating each candidate solution encountered during the search (e.g., according to a corresponding profit). In particular, the floor space allocator 10 may rely on iterative computations of lower and upper bounds of one or more values, such as profits or other measured values, to determine which candidate solutions are searched, in what order they are searched, and when a near optimal solution(s) (e.g., a solution corresponding to near maximum profit) is obtained.

For example, the floor space allocator 10 may update a "global" lower bound for benefit (e.g., profit) each time a the floor space allocator 10 evaluates a candidate solution having a benefit higher than a current lower bound, the floor space allocator 10 may update the lower bound to be equal to the benefit of the candidate solution. Subsequently, sections of the "tree" containing candidate solutions having only benefits lower than the lower bound (e.g., as determined by a benefit of a node of the tree from which many candidate solutions branch) may be eliminated from the search (e.g., these solutions are determined to be non-ideal solutions). Similarly, a "global" upper bound may be determined prior to and/or during the search such that sections of the "tree" having only solutions further away (numerically) from the upper bound than other sections of the "tree" may be "pruned," or eliminated from the search. Generally, the floor space allocator 10 may utilize any combination of upper and lower bounds to eliminate sections, classes, etc., of possible allocations solutions. The floor space allocator 10, for example, may determine that a substantially optimal solution is not included in certain groups, classes, sections, etc., of possible allocations solutions because all allocation solutions in the certain groups, classes, sections, etc. are below/above a window, range, or tolerance defined by current "global" upper and lower bounds. In such cases, near optimized allocation solutions may be determined to be those solution not eliminated in such a search and having the highest corresponding benefits, for example.

The number of possible candidate solutions, and therefore branches, can be very large. Thus, a floor space allocator may employ a specialized branching strategy to avoid a combinatorial explosion and reduce processing time, memory usage, data transfers, etc. in generating near optimal solution(s). In some implementations, floor space allocators may utilize one or more of the following branching strategies to search candidate solutions: (a) a category, or department, k is chosen in a realization $N_j$ and assigned to a specific fixture i in the retail space (e.g., $x_{ijk}=1$); (b) a realization $N_j$ is assigned to a specific fixture i, without choosing the specific category $k \in N_j$ $$\left( e.g., \sum_{k \in N_j} x_{ijk} = 1 \right);$$

or (c) a category k is chosen in a class or realization $N_j$, without choosing an assigned fixture i for the realization (e.g., $$\sum_{i=1}^{m} x_{ijk} = 1$$

for all i=1, . . . , m).

A floor space allocator may utilize strategy (a) to check for adjacencies, mandatory positions, etc., in an implementation. However, in some cases, the size of the branching tree of candidate solutions can become very large. Implementations utilizing strategy (b) lead to smaller branching trees, while maintaining adjacencies, mandatory positions, etc. However, when all categories or departments have been assigned to knapsacks, the floor space allocator may still need to choose the best items (e.g., individual products) for each category or department (cold medicine, candy, etc.). The floor space allocator may accomplish this by solving a multiple-choice knapsack problem for each knapsack, or fixture, as described further in U.S. patent application Ser. No. 12/773,617, filed on May 4, 2010 and entitled "METHOD AND SYSTEM FOR OPTIMIZING STORE SPACE AND ITEM LAYOUT," the entire disclosure of which is hereby expressly incorporated by reference herein. Implementations utilizing strategy (b) may also be referred to as "anonymous branching" implementations herein. As discussed further below, a Lagrangian upper bound may use the anonymous information from such a branching strategy quite efficiently. Implementations utilizing strategy (c) also lead to a smaller branching trees at the cost of maintaining adjacencies, mandatory positions, etc. Generally, floor space allocators may utilize any combination of these branching strategies (a), (b), and (c) and other suitable branching strategies to search and evaluate candidate solutions.

In some implementations, a floor space allocator utilizes certain branching orders to improve the efficiency of (e.g., to reduce a number of processor cycles required to) quickly find allocation solutions (and hence a tight lower bound to a profit value). For example, a floor space allocator may perform branching based on the most restricted (e.g., constrained by business rules) category or department first. In such an implementation, a floor space allocator may assign one or more scores to each category or department. A high score may represent that early branching, or early evaluation in the search of a tree of candidate solutions, for a particular department or category is preferable. One such example way of scoring categories or departments includes assigning a score of $\alpha_1|M_j|$ for mandatory locations corresponding to a category j, a score of $\alpha_2|F_j|$ for forbidden locations corresponding to a category j, a score of $\alpha_3|A_j|$ for colocated categories corresponding to a category j, and a score of $\alpha_4$ times a number of times another category collocates with the category j (e.g., $j \in N_j'$ for $j' \neq j$). The values of $\alpha_1, \alpha_2, \alpha_3$, and $\alpha_4$ may be adjusted to increase the efficiency of the floor space allocator in determining the allocation solutions. However, in one particular implementation, the values of $\alpha_1$, $\alpha_2, \alpha_3$, and $\alpha_4$ may all be positive and $\alpha_1, \alpha_2, \alpha_3$, and $\alpha_4$ may be ordered from largest to smallest as $\alpha_1, \alpha_3, \alpha_4$ and $\alpha_2$.

In many scenarios, the capacity of several knapsacks (e.g., fixtures) is the same. For example, a retail space may include multiple 7×10" shelving unites, multiple 6×12" shelving units, etc. Such scenarios may cause floor space allocators to generate many symmetric allocation solutions having substantially similar benefits (e.g., profits) for a certain retail store. In some implementations, floor space allocators may break such symmetries, at least partially. For example, assuming two fixtures i and i' (where i<i') are structurally "identical," i.e. they have the same capacity $c_i=c_{i'}$, no categories j have i or i' as mandatory fixtures, and both fixtures have the same set of forbidden categories (e.g., $\{j|i \in F_j\}=\{j|i' \in F_j\}$), a floor space allocator may determine that the smallest category number assigned to i should be smaller than the smallest category number assigned to i'. In other words, letting $B_i$ be the categories assigned to fixture i and $B_{i'}$ be the categories assigned to fixture i', a floor space allocator may only search and evaluate candidate solutions satisfying:

$$\arg \min_{j \in B_i} \leq \arg \min_{j \in B_{i'}}$$

As an example, assume that fixture (knapsack) 3 has been assigned departments $B_i=\{D3, D10\}$ while fixture (knapsack) 4 has been assigned departments (classes) $B_i'=(D12, D21)$. A floor space allocator may allow and evaluate this allocation solution because $\arg \min_{j \in B_i} = D3$ is smaller than all departments in $B_i'$. However, assume that fixture (knapsack) 3 has been assigned departments $B_i=\{D8, D10\}$ while fixture (knapsack) 4 has been assigned departments $B_i'=\{D7, D9\}$. A floor space allocator may not allow and may not evaluate this allocation solution because $\arg \min_{j \in B_i} = D8$ is not smaller than all departments in $B_i'$.

Some implementations of floor space allocators may also be configured to generate allocation solutions by: (i) using a model of the MCMKP in which capacity constraints are relaxed using Lagrange multipliers $\lambda_i \geq 0$ to generate a tight upper bound for profit; and (ii) then evaluate allocation solutions using a branch and bound algorithm as discussed above. In such implementations, the floor space allocators may be configured to utilize the following model of the MCMKP:

$$\text{maximize} \sum_{i=1}^{m} \sum_{j=1}^{n} \sum_{k \in N_j} p_{jk} x_{ijk} - \sum_{i=1}^{m} \lambda_i \left( \sum_{j=1}^{n} \sum_{k \in N_j} w_{jk} x_{ijk} - c_i \right)$$

$$\text{subject to:} \sum_{i=1}^{m} \sum_{k \in N_j} x_{ijk} = 1, j = 1, \ldots, n,$$

$$x_{ijk} \in \{0, 1\}, i = 1, \ldots, m, j = 1, \ldots, n, k \in N_j$$

Further, rewriting the objective function yields:

$$\text{maximize} \sum_{i=1}^{m} \sum_{j=1}^{n} \sum_{k \in N_j} (p_{jk} - \lambda_i w_{jk}) x_{ijk} + \sum_{i=1}^{m} \lambda_i c_i$$

$$\text{subject to:} \sum_{i=1}^{m} \sum_{k \in N_j} x_{ijk} = 1, j = 1, \ldots, n,$$

$$x_{ijk} \in \{0, 1\}, i = 1, \ldots, m, j = 1, \ldots, n, k \in N_j$$

Because the objective function does not depend on the fixture i, a choice of Lagrangian multipliers utilized by an example floor space allocator may be $\lambda_i = \ldots = \lambda_m = \lambda$. Such a choice of Lagrangian multipliers yields:

$$\text{maximize} \sum_{j=1}^{n} \sum_{k \in N_j} (p_{jk} - \lambda w_{jk}) x_{jk} + \lambda \sum_{i=1}^{m} c_i$$

$$\text{subject to:} \sum_{k \in N_j} x_{jk} = 1, j = 1, \ldots, n,$$

$$x_{ijk} \in \{0, 1\}, j = 1, \ldots, n, k \in N_j$$

This resulting problem is an ordinary Multiple-choice Knapsack Problem (MCKP), which MCKP may be initially solved by the floor space allocator 10 to generate a tight upper bound. A floor space allocator, such as the floor space allocator 10, may solve this problem in linear time by selecting the item $k \in N_1$ having the biggest value of $p_{jk} - \lambda_{w_{jk}}$. The resulting objective value may be a valid upper bound for a branch and bound algorithm utilized by a floor space allocator to generate allocation solutions. In order to find the optimal choice of A in implementations utilizing $\lambda_i = \ldots = \lambda_m = \lambda$, the floor space allocator 10, for example, may utilize a binary search in an interval 0 to $$M = \sum_{i=1}^{m} c_i.$$

Because the Lagrangian function is convex, the binary search will return the value $\lambda$ substantially minimizing $$\sum_{j=1}^{n} \sum_{k \in N_j} (p_{jk} - \lambda w_{jk}) x_{jk} + \lambda \sum_{i=1}^{m} c_i$$

(e.g., finding the tightest upper bound).

In addition to the "relaxation" of the problem discussed above, floor space allocators, such as the floor space allocator 10, may also utilize a surrogate relaxation of the problem yielding a multiple-choice knapsack problem that is solvable in linear time, in an implementation.

In some implementations, floor space allocators rule out certain assignments of categories (e.g., departments or product types) into fixtures by tightening bounds. For example, for a knapsack (e.g., "fixture") i having been assigned categories $\{N_1^i, \ldots, N_r^i\}$, a floor space allocator may execute a dynamic programming recursion for categories $\{N_1^i, \ldots, N_r^i\}$ using a capacity $c_i$. For example, the following dynamic programming recursion may be executed for categories or departments $\{N_1^i, \ldots, N_r^i\}$ assigned to fixture i:

$$z_l(d) = \max \begin{cases} z_{l-1}(d - w_{l1}) + p_{l1}, 0 \le d - w_{l1} \\ z_{l-1}(d - w_{l2}) + p_{l2}, 0 \le d - w_{l2} \\ \vdots \\ z_{l-1}(d - w_{lN_l}) + p_{lN_l}, 0 \le d - w_{lN_l} \end{cases}$$

The floor space allocator may utilize the results of such a dynamic programming recursion as a new (super) category $N_i'$ that may replace the originally assigned categories $\{N_1^i, \ldots, N_r^i\}$.

Figure 11:
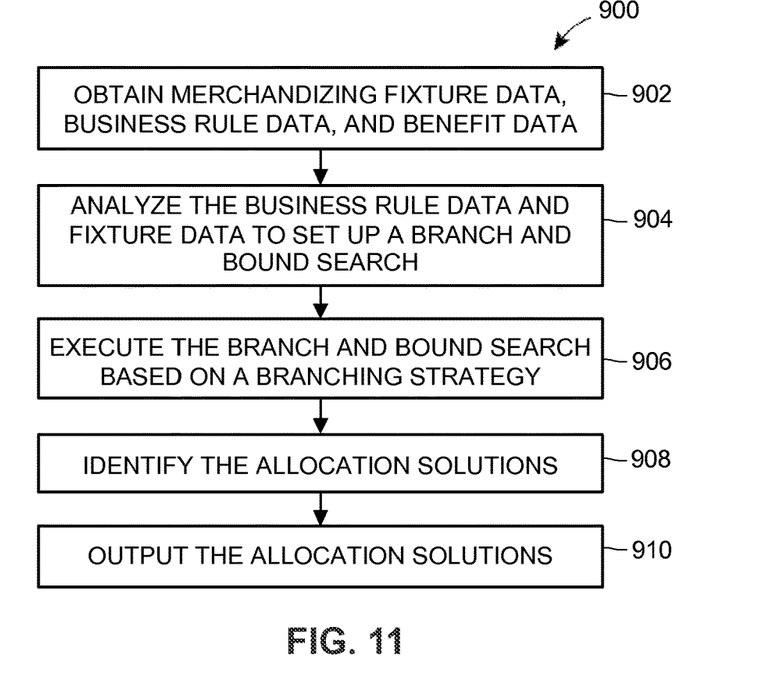
FIG. 11 is a flow diagram of an example method for automatically allocating floor space that can be implemented in the floor space allocator illustrated in FIG. 1.

FIG. 11 is a flow diagram of an example method 900 for automatically allocating floor space within a retail store such that a benefit is near maximized, categories fit within a total available space, and certain business rules are satisfied. The method 900 may be implemented by the floor space allocator 10, for example.

To begin, the merchandizing fixture data, business rule data, and benefit data is obtained (block 902). As further discussed with reference to FIGS. 1-7, this data may define a plurality of fixtures, benefit dependencies for categories (or departments) of products, and mandatory locations, colations, and forbidden locations of categories of products. Further, allocation parameters, such as size increments and maximum/minimum department sizes may be obtained.

The merchandizing fixture data and business rule data is then analyzed to initialize a branch and bound search of a solution space or state space (block 904). For example, as indicated above, the floor space allocator 10 may initiate a branch and bound algorithm to solve a multiple-choice multiple knapsack problem (MCMKP) with various constraints related to various business rules.

The solution space or state space is of the MCMKP is then searched for solutions near maximizing a benefit (e.g., profitability) while ensuring that categories fit within a total available space and certain business rules are satisfied (block 906). Various branching strategies as discussed above may improve the efficiency of the search of the solution space such that many solutions (e.g., arrangements of product categories) need not be assessed. Further, the floor space allocator 10 may, in some implementations, initially solve an MCKP to generate a tight upper bound for profit (or other utilized measure of benefit) and then utilize the upper bound in a search of candidate solutions to the MCMKP.

A number of allocations solutions is then identified by the floor space allocator (block 908). In some implementations, many "equal-benefit" solutions may be identified, and, in other implementations, a single allocation solution may be identified. These identifications may be based on a near maximum or otherwise optimized benefit of an arrangement of product categories on the defined merchandizing fixtures. Once identified, the floor space allocator may output the allocation solutions (block 910). The floor space allocator may output the allocation solutions in any suitable manner including, by way of example, displaying on a display device, storing on a computer-readable medium, transmitting via a computer network, etc. the allocation solutions.

We claim:

1. A computer-implemented method comprising:
 obtaining, by a computer processor:
  (i) fixture data representing a plurality of merchandizing fixtures in a retail space,
  (ii) business rule data representing a plurality of business rules associated with a plurality of categories of products, the plurality of business rules including at least one of forbidden locations, mandatory locations, or colocations of the plurality of categories on the plurality of merchandizing fixtures, and
  (iii) benefit data representing a dependency of a benefit of each of the plurality of categories of products on an amount of one of the plurality of merchandizing fixtures allocated to the category of products;
 generating, by the computer processor, (i) a preliminary arrangement of the plurality of categories using a first objective function independent of the plurality of merchandizing fixtures, and (ii) a tight upper bound for a branching strategy;
 searching, by a floor space allocator executed by the computer processor, a plurality of arrangements of the plurality of categories of products on the plurality of merchandizing fixtures according to the branching strategy and the tight upper bound, wherein each of the plurality of arrangements are evaluated using a second objective function depending on the plurality of merchandizing fixtures and constrained according to the fixture data, the business rule data, and the benefit data;
 determining, by the floor space allocator, an allocation solution before all possible arrangements of the plurality of categories of products on the plurality of merchandizing fixtures are searched,
  wherein the allocation solution specifies a combination of the plurality of categories of products, an identification of ones of the plurality of merchandizing fixtures allocated to each of the combination of the plurality of categories of products, and an amount of the ones of the plurality of merchandizing fixtures allocated to each of the combination of the plurality of categories of products, and
  wherein the allocation solution corresponds to a substantially optimized benefit, the substantially optimized benefit based on the benefit of each category in the combination of the plurality of categories; and
 displaying, on a display device, information indicative of the allocation solution.

2. The computer-implemented method of claim 1, wherein determining the allocation solution includes determining a plurality of allocation solutions, each of the allocation solutions corresponding to the substantially optimized benefit.

3. The computer-implemented method of claim 2, further comprising filtering, by a solution filter, the plurality of allocation solutions to determine one of the plurality of allocation solutions that requires a substantially minimum amount of rearrangement with respect to a current layout of the retail space.

4. The computer-implemented method of claim 2, further comprising filtering, by a solution filter, the plurality of allocation solutions to determine one or more further constrained allocation solutions that satisfy additional business rules different from the plurality of business rules defined by the business rule data.

5. The computer-implemented method of claim 4, wherein the plurality of arrangements is a first plurality of arrangements, and wherein filtering the plurality of allocation solutions to determine the one or more further constrained allocation solutions that satisfy the additional business rules includes:
 searching, by the floor space allocator, a second plurality of arrangements of the plurality of categories of products on the plurality of merchandizing fixtures according to the fixture data, the business rule data, the additional business rules, and the benefit data and according to the branching strategy, and determining, by the floor space allocator, the one or more further constrained allocation solutions before all possible arrangements of the plurality of categories of products on the plurality of merchandizing fixtures are searched.

6. The computer-implemented method of claim 1, wherein searching the plurality of arrangements of the plurality of categories of products on the plurality of merchandizing fixtures includes executing a branch and bound algorithm based on the branching strategy.

7. The computer-implemented method of claim 1, wherein the benefit of each of the plurality of categories of products is a profitability of each of the plurality of categories of products in a certain time period.

8. The computer-implemented method of claim 1, wherein the tight upper bound is utilized to determine the allocation solution along with a lower bound that is updated as the plurality of arrangements of the plurality of categories of products are searched.

\* \* \* \* \*